Oct. 29, 1929.    W. F. DEHUFF    1,733,945
MIXING MACHINE
Filed March 9, 1929    3 Sheets-Sheet 1
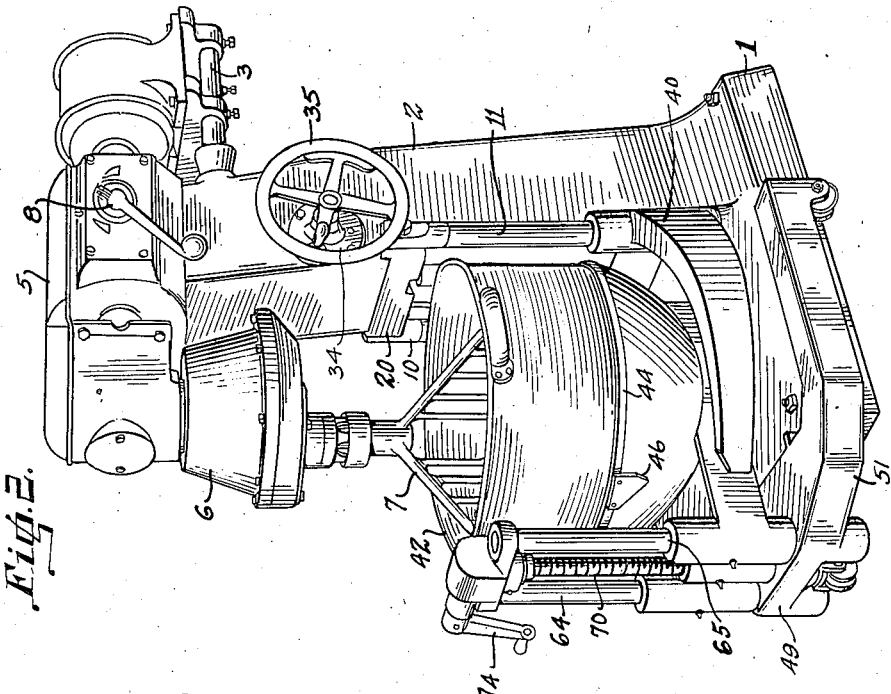
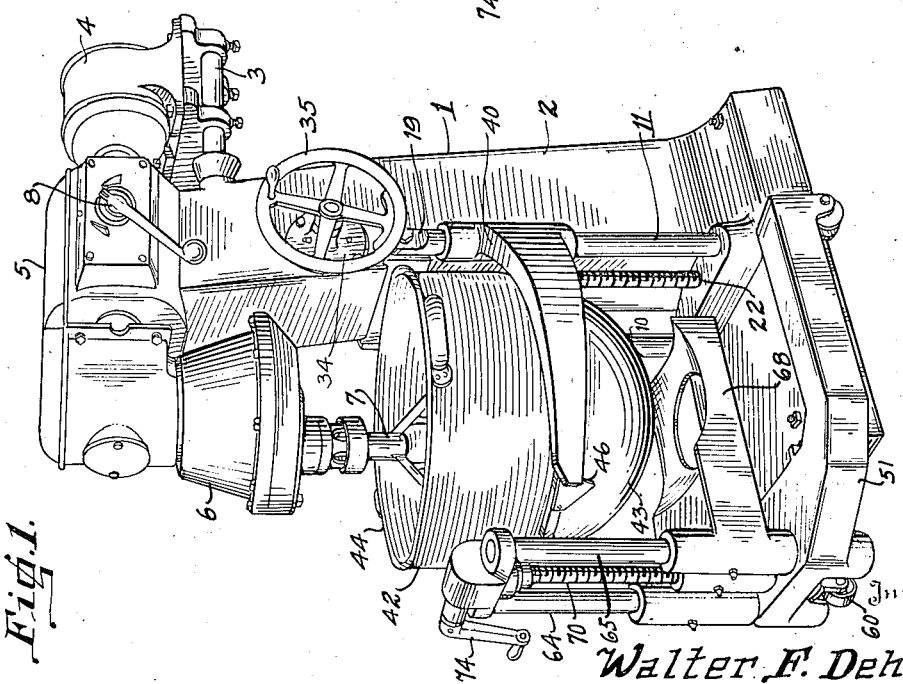
Inventor
Walter F. Dehuff
By Mason Fenwick & Lawrence
Attorneys Oct. 29, 1929.   W. F. DEHUFF   1,733,945
MIXING MACHINE
Filed March 9, 1929   3 Sheets-Sheet 2
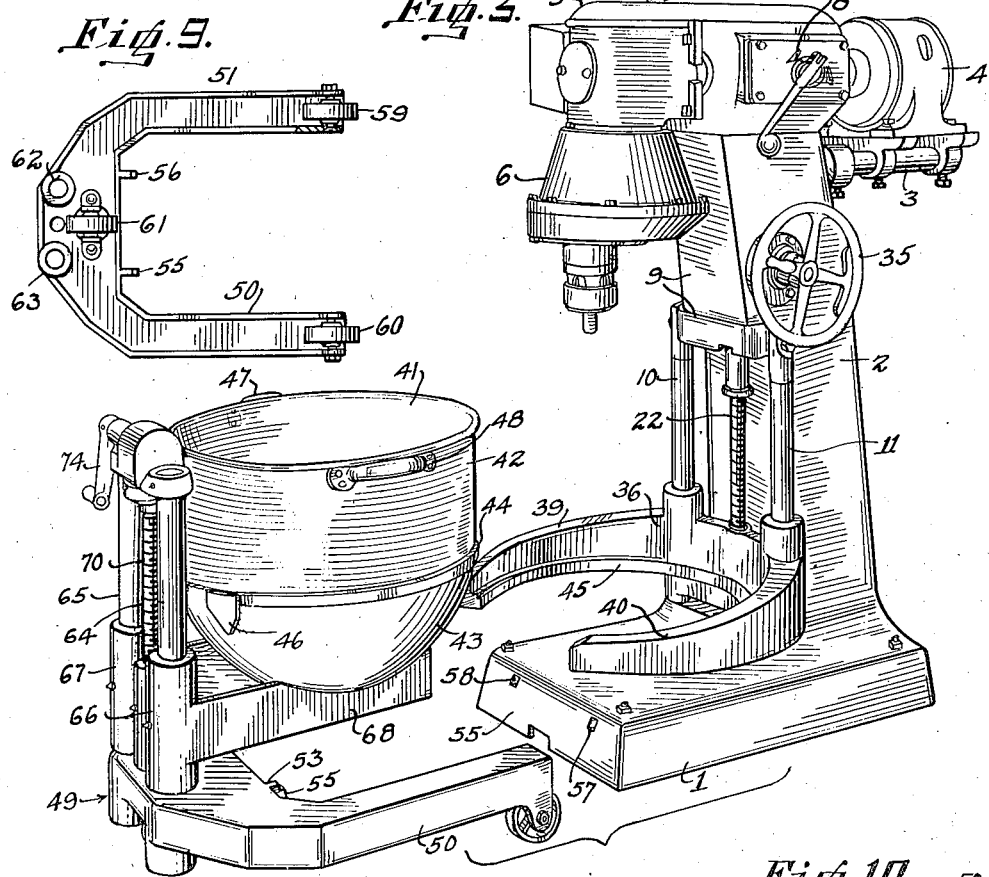
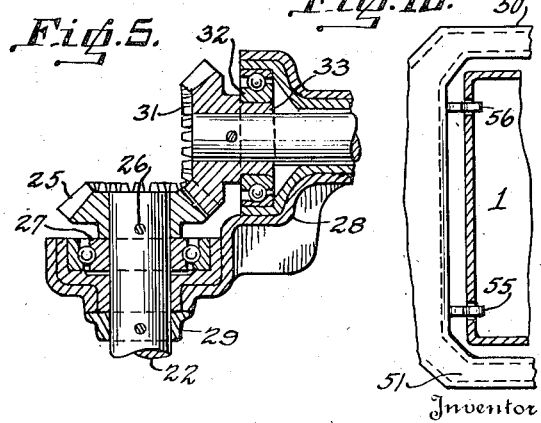
Inventor
Walter F. Dehuff
By Mason Fenwick & Lawrence
Attorneys Oct. 29, 1929.  W. F. DEHUFF  1,733,945
MIXING MACHINE
Filed March 9, 1929   3 Sheets-Sheet 3
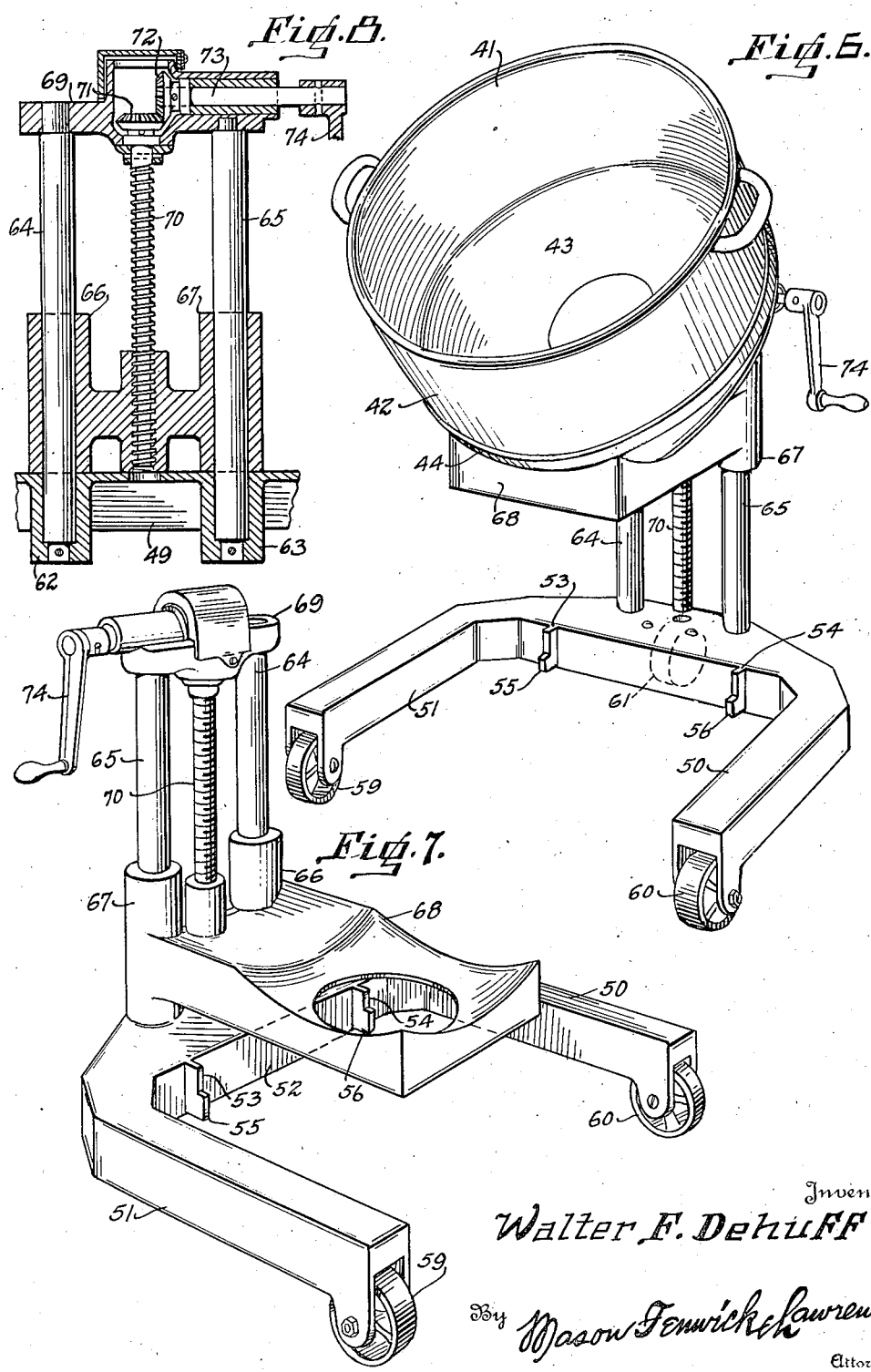
Inventor
Walter F. Dehuff
By Mason Fenwick & Lawrence
Attorneys Patented Oct. 29, 1929

1,733,945

UNITED STATES PATENT OFFICE

WALTER F. DEHUFF, OF GLEN ROCK, PENNSYLVANIA

MIXING MACHINE

Application filed March 9, 1929. Serial No. 345,820.

This invention relates to dough mixing machines of the power operated type in which large bowls are used to hold dough in position under a power operated beater.

In this type of machine, the mixing bowl is commonly made in the form of a cylinder having a hemispherical bottom, and having a rib extending around the outside thereof about the joint between the cylindrical body and hemispherical bottom. Heretofore, it has been customary to support these bowls under the mixing head of such machines by means of an annular bracket extending completely around the cylindrical body of the bowl having an inwardly projecting flange seating under the rib on the outside of the bowl. This bracket has usually been mounted to be raised and lowered slidably on a standard supporting the mixing head, and relative to the mixing head by means of a screw connected to one end of the bracket.

The greatest drawback to the use of this old type of mixer resides in the fact, that when it becomes necessary or desirable to move the beaten dough from the machine to the table the supporting bracket has to be lowered from the beater and the heavy bowl with its contents lifted bodily upward out of the annular supporting bracket in order to clear the cylindrical bottom of the mixing bowl from the supporting bracket. Since these bowls with their contents may weigh three or four hundred pounds, it is obvious that moving the mixing bowl from the machine is a very awkward and arduous job; which, is usually effected, in the case of large machines, by traveling cranes, or similar clumsy mechanisms.

The main object of the present invention is to obviate all these cumbersome operations in the use of this type of machine, and to provide mechanism by which one man can, with little exertion, raise and lower the mixing bowl and its contents toward and from the mixing head of the machine; and, by which he can move the bowl in any desired direction toward and from the machine.

Another object of the invention is to provide, as part of the aforesaid mechanism, a trolley having a seat for the hemispherical bottom of the bowl, on which the bowl may be tilted in any desired direction, and which may be raised and lowered to position the bowl at any height found convenient for operation.

A further object of the invention is to provide a machine of this type with a bowl handling trolley which may be frictionally locked to and form a part of the mixing machine, and which will occupy very little additional space over that required for the main body of the machine.

Other objects of the invention will become apparent as the detailed description thereof proceeds.

In the drawings:

Fig. 1 is a perspective view of my invention showing a dough mixing machine with the bowl supporting bracket in position to support a mixing bowl in operative relation to the beater head of the machine;

Fig. 2 is a similar view showing the bowl-supporting bracket lowered beyond the bowl-supporting arm of a trolley adapted to be detached from the machine and to move the bowl in any desired direction relative to the machine;

Fig. 3 is an exploded perspective view showing the trolley separated from the main body of the machine, and supporting the convex hemispherical bottom of the mixing bowl in a correspondingly shaped concave recess of a vertically adjustable bowl supporting arm on the trolley;

Fig. 4 is a fragmentary sectional detail of mechanism for raising and lowering the bracket for holding the mixing bowl in the dough heating part of the machine;

Fig. 5 is a fragmentary vertical section, to a larger scale than Fig. 4, through gearing for raising and lowering the bowl supporting bracket of the mixing machine;

Fig. 6 is a perspective view of the bowl supporting trolley, illustrating the bowl in tilted position thereon;

Fig. 7 is a perspective view of the trolley itself;

Fig. 8 is a fragmentary vertical section through the mechanism for raising and lowering the bowl supporting arm of the trolley;

Fig. 9 is a bottom plan view of the trolley base; and

Fig. 10 is a fragmentary detail illustrating means for positioning and locking the base of the trolley to the base of the mixing machine.

The machine shown in the drawings comprises a base 1, adapted to be suitably secured to a floor or other foundation, and having a standard 2 extending vertically upward from said base.

The upper part of the standard 2 has a bracket 3 extending from the rear face thereof; and on this bracket is mounted a motor 4 for operating mechanism (not shown) within the casings 5 and 6 to rotate the eccentrically mounted planetary beater head 7. This mechanism is of a variable speed type which may have its speed controlled by an adjustable handle or crank 8 mounted on the side of the casing 5.

The apparatus so far described is fully disclosed and claimed in my copending application Serial No. 360,577, filed May 4th, 1929; and, as its specific details form no part of the present invention, they need no further description in this case.

The standard 2 is a hollow casting having an overhanging part 9, beneath which vertical cylindrical guide rods 10 and 11 are located. The lower ends of the rods 10 and 11 are reduced to form shoulders 12 and 13 (see Fig. 4) from which extend the screwthreaded parts 14 and 15 to receive the nuts 16 and 17 for locking the rods 10 and 11 to the base 1.

The upper ends of the rods 10 and 11 are flattened to receive bolts 18 and 19, respectively, for securing these ends to casing 20 provided with a centrally located bearing 21 in which is journaled a vertical screwthreaded shaft 22. The shaft 22 is held against upward axial movement in the bearing 21 by means of sleeve 23 fixed to the shaft by a pin 24; and is held against downward axial movement by means of the bevel gear 25 secured to the upper end of the shaft by pin 26 and seated on the inner member 27 of a ball bearing seated in a casing 28 suitably secured to the side wall of the standard 2. A washer 29 pinned to shaft 22 contacts with the bottom of casing 28 and supplements sleeve 23 in holding shaft 22 against upward axial movement in the bearing 21.

A stub shaft 30 extends through a side of the standard 2 at right angles to the shaft 22, and has a beveled gear 31 secured to the end thereof and in mesh with the bevel gear 25. The shaft 30 is provided with a ball bearing 32, shown clearly in Fig. 5 as seating the hub 33 of the gear 31. The shaft 30 is journaled in a bearing 34, which is suitably secured to the side of the standard 2, and is provided with a crank 35 secured in any suitable manner to the end of said shaft. The gearing construction will be obvious from inspection of Figs. 4 and 5, and may be varied as desired, as the specific details thereof form no part of the present invention, as all that is required in this instance is to provide something conveniently located to cause rotation of the shaft 22.

The part of shaft 22 below the sleeve 23 is screwthreaded to engage internal screwthreads formed in the bracket 36 between the apertures 37 and 38 which slidably receive the cylindrical guide rods 10 and 11, respectively. As will be obvious from the drawing, rotation of the handwheel 35 causes the rotation of the shaft 22, and thereby through the screwthreaded connection with the bracket 36 raises and lowers the bracket 36 as desired toward and from the beater mechanism contained in the casing 6.

The bracket 36 is segmental in shape, and this segment is greater than a semi-circle, in order that the arms 39 and 40 of the bracket may engage and securely hold the mixing bowl 41. The mixing bowl 41 has a cylindrical body 42 connected to a hemispherical bottom 43. A rib 44 extends around the cylindrical body 42 where it joins the bottom 43; and this rib is adapted to seat on a flange 45 projecting inwardly from the bracket 36 and the arms 39 and 40 thereof, stop plates 46 (only one of which is shown) being provided on the rib 44 to contact with the ends of the arms 39 and 40, in order to position the bowl 41 properly on the bracket 36, with the handles 47 and 48 located for convenient operation of the bowl on the trolley support, hereinafter described.

Cooperating with the bowl-supporting bracket mechanism so far described, this invention includes a trolley having a bifurcated base 49, the furcations 50 and 51 of which fits slidably and snugly along the opposite sides of the base 1.

The intermediate part 52 of the base 49 is provided with projecting lugs 53 and 54, adapted to contact with the front end 55 of the base 1. The lugs 53 and 54 are provided with slightly wedgeshaped projections 55 and 56 adapted to fit frictionally in correspondingly shaped apertures 57 and 58 in the front wall 55 of the base 1. By this construction the bifurcated base 49 is always positioned exactly relative to the base 1 in order to center its bowl-supporting arm with the center of the bracket 36.

The base 49 is provided with casters 59, 60 and 61 to adapt the base for movement in any desired direction toward and from the base 1. The intermediate part of the base 1 is provided with bosses 62 and 63 in which are suitably secured the lower ends of guide rods 64 and 65, adapted to receive slidably the sleevelike members 66 and 67 of a bowl-supporting bracket 68.

The upper ends of rods 64 and 65 are connected to each other by a gear casing 69, suitably secured to said upper ends. A screwthreaded shaft is centrally mounted on said casing intermediate the guide rods 64 and 65, and this shaft 70 engages internal screw-threads formed in the center part of the arm 68 intermediate the sleevelike members 66 and 67. The upper end of shaft 70 has a beveled gear 71 secured thereto, and in mesh with a beveled gear 72 connected to the end of the shaft 73 rotatably mounted in the gearing casing 69 and operated by a crank handle 74.

The bowl-supporting bracket 68 extends inwardly between the furcations 50 and 51, and at its end is concaved to fit the bottom 43 of the bowl 41 to form a support on which the said bowl may be tilted in any desired direction after its removal from the bracket 36.

It is to be noted that the bracket arm 68 cooperates with the bracket 36 to form a conjoint support for the bowl 41; and that the bracket arm 68 is made of the same width as the distance between the ends of the arms 39 and 40 of the bracket 36 in order that the arm 68 may slide freely between the arms 39 and 40.

The parts of the trolley are so dimensioned that they may center the bowl 41 under the beater head 7 and are adapted to form, if desired, a supplementary support to the bracket 36.

In Fig. 1 the bowl 41 is shown wholly supported by the bracket 36, and the trolley is shown with its arm 68 positioned at its lowest point vertically below the bowl 41. When it is desired to remove the bowl from the mixing machine, the handwheel 35 is operated to lower the bracket 36 below the trolley arm 68, which then engages the bottom 43 of the bowl 41 and takes thereon the entire weight of said bowl and its contents. The trolley may then be pulled out laterally from its engagement with the sides and front of the base 1, and may be moved to the baker's table or to any other place desired.

It is obvious that the bracket arm 68 with its bowl may be raised by operation of the crank handle 74 to any desired and convenient height and, that whenever it becomes desirable to remove dough from the bowl near the bottom thereof, the bowl may be tilted, as shown in Fig. 6, to render this operation most convenient.

What I claim is:

1. In a mixing machine, a support having a beater head rotatable thereon, a mixing bowl, a frame detachably connected to said support, and cooperating means on said support and frame for moving the bowl substantially vertically relative to said beater head.

2. In a mixing machine, a support having a beater head rotatable thereon, a mixing bowl, a frame detachably connected to said support, and means on said support and on said frame for supporting said bowl and operable simultaneously and alternatively to move said bowl substantially vertically toward and from said beater head.

3. In a mixing machine, a support having a beater head rotatable thereon, a mixing bowl having a cylindrical body and hemispherical bottom and having a rib projecting around the outside of said body, a frame detachably connected to said support, and means on said support and on said frame to engage said rib and said bottom, respectively, for moving the bowl toward and from said beater head either simultaneously or alternatively.

4. In a mixing machine, a support having a beater head rotatable thereon, a mixing bowl having a cylindrical body and hemispherical bottom and having a rib projecting around the outside of said body, a frame detachably connected to said support, and independently operable means on said support and on said frame and engageable with said rib and bottom, respectively, for adjustably supporting said bowl in any desired position relative to said beater head.

5. In a mixing machine, a support having a beater head rotatable thereon, a cylindrical mixing bowl, a frame detachably connected to said support, means on said support for supporting and moving said bowl toward and from the beater head, and means on said frame for supporting and moving said bowl toward and from the beater head independently of the first named means.

6. In a mixing machine, a support having a beater head rotatable thereon, a cylindrical mixing bowl, a frame detachably connected to said support, a bracket slidably mounted on said support and adapted to support said bowl and move said bowl relative to the beater head, a bracket slidably mounted on said frame and adapted to support said bowl independently of the first named bracket and to move said bowl toward and from the beater head, means on said support for reciprocating the first named bracket, and means on said frame for reciprocating the second named bracket.

7. In a mixing machine, a support having a beater head rotatable thereon, a mixing bowl, a frame detachably connected to said support, means on said support for supporting and moving said bowl toward and from said beater head, means on said frame for supporting and moving said bowl toward and from said beater head independently of said first named means, said frame being adapted to carry the bowl away from said support when each of the bowl supporting means is in its lowest position on said support and frame, respectively.

8. In a mixing machine, a support having handles projecting laterally therefrom and a beater head rotatable thereon, a mixing bowl having a supporting rib on the outside thereof, a bracket adjustable vertically on said support toward and from said beater head and having arms projecting laterally therefrom to seat under said supporting rib, and stops formed on said bowl to engage the ends of said arms for locating the bowl in a predetermined position on said arms.

9. In a mixing machine, a support having a beater head rotatable thereon, a cylindrical mixing bowl having handles projecting laterally therefrom and a supporting rib on the outside thereof, a bracket adjustable vertically on said support toward and from said beater head and having arcuate arms projecting laterally therefrom to embrace the wall of said bowl and seat under said rib, and stops on said bowl abutting the ends of said arms to locate said bowl in predetermined position on said arms.

10. In a mixing machine, a support having a beater head rotatable thereon, a mixing bowl having a hemispherical bottom, a trolley comprising a frame detachably connected to said support and having a bracket extending laterally from said frame, said bracket having a hemispherical recess forming a supporting seat for the bottom of said bowl, and means on said frame to adjust said bracket relative to said beater head.

11. In a mixing machine, a support having a beater head axially rotatable thereon, a mixing bowl, a trolley detachably connected to said support, and means on said trolley for supporting said bowl and moving it vertically toward and from said beater head.

12. In a mixing machine, a support having a beater head axially rotatable thereon, a mixing bowl, a trolley detachably connected to said support, a bracket for supporting said mixing bowl, and means on said trolley for moving said bracket vertically toward and from the beater head.

13. In a mixing machine, a support having a beater head rotatable thereon, a mixing bowl having a hemispherical bottom, a trolley detachably connected to said support, a bracket extending laterally from said trolley and having a hemispherical recess adapted to seat said bottom and support said bowl thereby, and means for adjusting said bracket toward and from said beater head.

14. In a mixing machine, a support having a beater head rotatable thereon, a mixing bowl having a hemispherical bottom, a trolley detachably connected to said support, a bracket extending from said trolley and having a hemispherical recess in which said bottom is supported, means for adjusting said bracket toward and from said beater head, and means on said trolley engageable with said support to locate the trolley in a predetermined position relative to said beater head.

15. In a mixing machine, a support having a beater head rotatable thereon, a mixing bowl, means slidable on said support toward and from said mixing head and having spaced apart arms adapted to embrace and support said bowl, and a trolley detachably connected to said support and having a bracket movable between said arms and adapted to engage and support the bottom of said mixing bowl between said arms and to move into and out of the space between said arms.

16. A trolley comprising a base, a support extending vertically therefrom, a bracket extending laterally from said support, means for adjusting said bracket vertically toward and from said base, and antifriction members mounted on said base.

17. A trolley comprising a base, a pair of cylindrical guide rods extending perpendicularly from one end of said base, a bracket extending laterally from said rods and slidable thereon and having a concave recess adapted to seat a container having a hemispherical bottom, and means for adjusting said bracket on said guide rods.

In testimony whereof I affix my signature.
WALTER F. DEHUFF.